US012649280B2

(12) United States Patent
Studanski et al.

(10) Patent No.: US 12,649,280 B2
(45) Date of Patent: Jun. 9, 2026

(54) METHOD OF CONCURRENTLY 3D PRINTING EXTRUDED PARTS HAVING DISSIMILAR SLICE HEIGHTS

(71) Applicant: Stratasys, Inc., Eden Prairie, MN (US)

(72) Inventors: Thomas J. Studanski, Plymouth, MN (US); Erik K. Heide, Eden Prairie, MN (US)

(73) Assignee: STRATASYS, INC., Minnetonka, MN (US)

( * ) Notice: Subject to any disclaimer, the term of this patent is extended or adjusted under 35 U.S.C. 154(b) by 416 days.

(21) Appl. No.: 18/400,808

(22) Filed: Dec. 29, 2023

(65) Prior Publication Data

US 2025/0214304 A1     Jul. 3, 2025

(51) Int. Cl.
| | |
|---|---|
| *B29C 64/386* | (2017.01) |
| *B29C 64/118* | (2017.01) |
| *B29C 64/209* | (2017.01) |
| *B29C 64/321* | (2017.01) |
| *B29C 64/393* | (2017.01) |
| *B33Y 50/00* | (2015.01) |
| *B29C 64/40* | (2017.01) |
| *B33Y 10/00* | (2015.01) |

(Continued)

(52) U.S. Cl.
CPC .......... *B29C 64/386* (2017.08); *B29C 64/118* (2017.08); *B29C 64/209* (2017.08); *B29C 64/321* (2017.08); *B29C 64/393* (2017.08); *B33Y 50/00* (2014.12); *B29C 64/40* (2017.08); *B33Y 10/00* (2014.12); *B33Y 30/00* (2014.12); *B33Y 40/00* (2014.12); *B33Y 50/02* (2014.12)

(58) Field of Classification Search
CPC ... B29C 64/386; B29C 64/118; B29C 64/209; B29C 64/321; B29C 64/393; B29C 64/40; B29C 64/106; B33Y 50/00; B33Y 10/00; B33Y 30/00; B33Y 40/00; B33Y 50/02
See application file for complete search history.

(56) References Cited

U.S. PATENT DOCUMENTS

| | | | |
|---|---|---|---|
| 5,503,785 A | 4/1996 | Crump et al. | |
| 5,866,058 A | 2/1999 | Batchelder et al. | |

(Continued)

OTHER PUBLICATIONS

"Local Adaptive Slicing for Layered Manufacturing", by Tyberg, Virginia Polytechnic Institute and State University, Feb. 16, 1998, 83 pgs., (Year: 1998).

(Continued)

*Primary Examiner* — Zhipeng Wang
(74) *Attorney, Agent, or Firm* — Westman, Champlin & Koehler, P.A.

(57) ABSTRACT

A method of printing a plurality of parts with varying layer heights in a single print job in a 3D printer includes providing a plurality of sliced 3D digital representations of a plurality of parts with varying slice heights in the Z direction, positioning the digital representation of parts on a build platform of the 3D printer and determining a printing sequence of the layers of the parts based upon a lowest Z height between the plurality of sliced 3D digital representations. The method further includes extruding the layers of the plurality of disjoined parts with one or more print heads based upon the determined printing sequence and intermittently indexing z height between the sequenced layers until each of the plurality of parts is printed.

23 Claims, 10 Drawing Sheets

(51) Int. Cl.

| | |
|---|---|
| *B33Y 30/00* | (2015.01) |
| *B33Y 40/00* | (2020.01) |
| *B33Y 50/02* | (2015.01) |

(56) References Cited

U.S. PATENT DOCUMENTS

| | | | |
|---|---|---|---|
| 6,004,124 | A | 12/1999 | Swanson et al. |
| 6,547,995 | B1 | 4/2003 | Comb |
| 6,859,681 | B1* | 2/2005 | Alexander ......... G05B 19/4099 |
| | | | 700/98 |
| 7,127,309 | B2 | 10/2006 | Dunn et al. |
| 7,297,304 | B2 | 11/2007 | Swanson et al. |
| 7,384,255 | B2 | 6/2008 | LaBossiere et al. |
| 7,604,470 | B2 | 10/2009 | LaBossiere et al. |
| 7,896,209 | B2 | 3/2011 | Batchelder et al. |
| 7,897,074 | B2 | 3/2011 | Batchelder et al. |
| 8,153,182 | B2 | 4/2012 | Comb et al. |
| 8,403,658 | B2 | 3/2013 | Swanson |
| 8,647,102 | B2 | 2/2014 | Swanson et al. |
| 8,985,497 | B2 | 3/2015 | Mannella et al. |
| 9,073,263 | B2 | 7/2015 | Mannella et al. |
| 9,090,428 | B2 | 7/2015 | Batchelder et al. |
| 9,108,360 | B2 | 8/2015 | Comb et al. |
| 2018/0043631 | A1* | 2/2018 | Heide ................... B29C 64/393 |

OTHER PUBLICATIONS

"Effect of Additive Slicing on Surface Integrity and Additive Manufacturing", by Sikder, Proceedings of the ASME 2014 International Design Engineering Technical Conference & Computers and Information in Engineering Conference, Aug. 2014, 11 pgs., (Year 2014).
"A Surface Based Approach to Recognition of Geometric Features for Quality Freeform Surface Machining", by Zhang, Computer-Aided Design 36 (2004), pp. 735-744 (Year 2004).
Office Action from U.S. Appl. No. 15/235,603, dated Aug. 24, 2018.
Office Action from U.S. Appl. No. 15/235,603, dated Feb. 28, 2019.

* cited by examiner

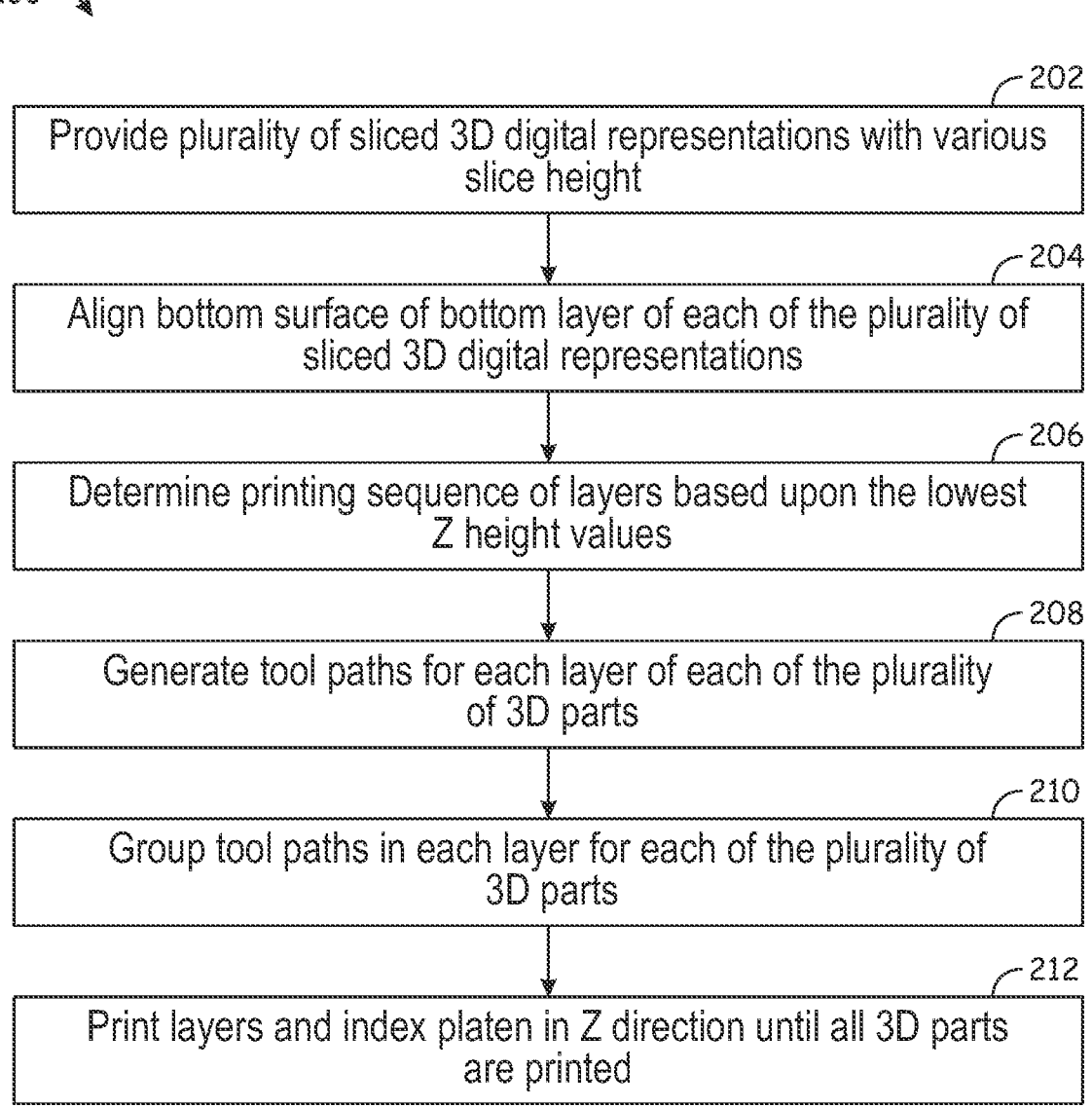

200

202

Provide plurality of sliced 3D digital representations with various slice height

204

Align bottom surface of bottom layer of each of the plurality of sliced 3D digital representations

206

Determine printing sequence of layers based upon the lowest Z height values

208

Generate tool paths for each layer of each of the plurality of 3D parts

210

Group tool paths in each layer for each of the plurality of 3D parts

212

Print layers and index platen in Z direction until all 3D parts are printed

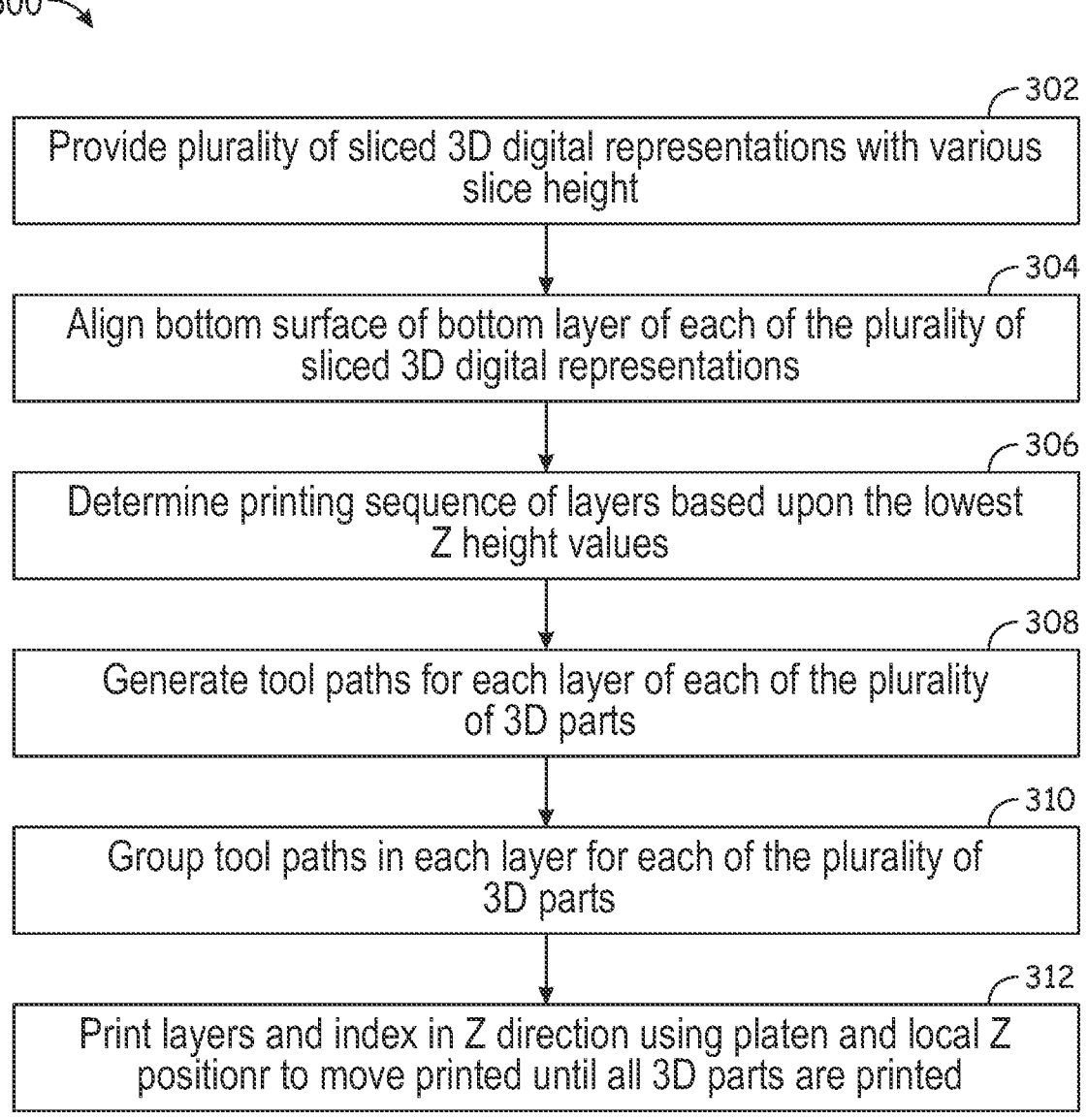

302

Provide plurality of sliced 3D digital representations with various slice height

304

Align bottom surface of bottom layer of each of the plurality of sliced 3D digital representations

306

Determine printing sequence of layers based upon the lowest Z height values

308

Generate tool paths for each layer of each of the plurality of 3D parts

310

Group tool paths in each layer for each of the plurality of 3D parts

312

Print layers and index in Z direction using platen and local Z positionr to move printed until all 3D parts are printed

FIG. 8

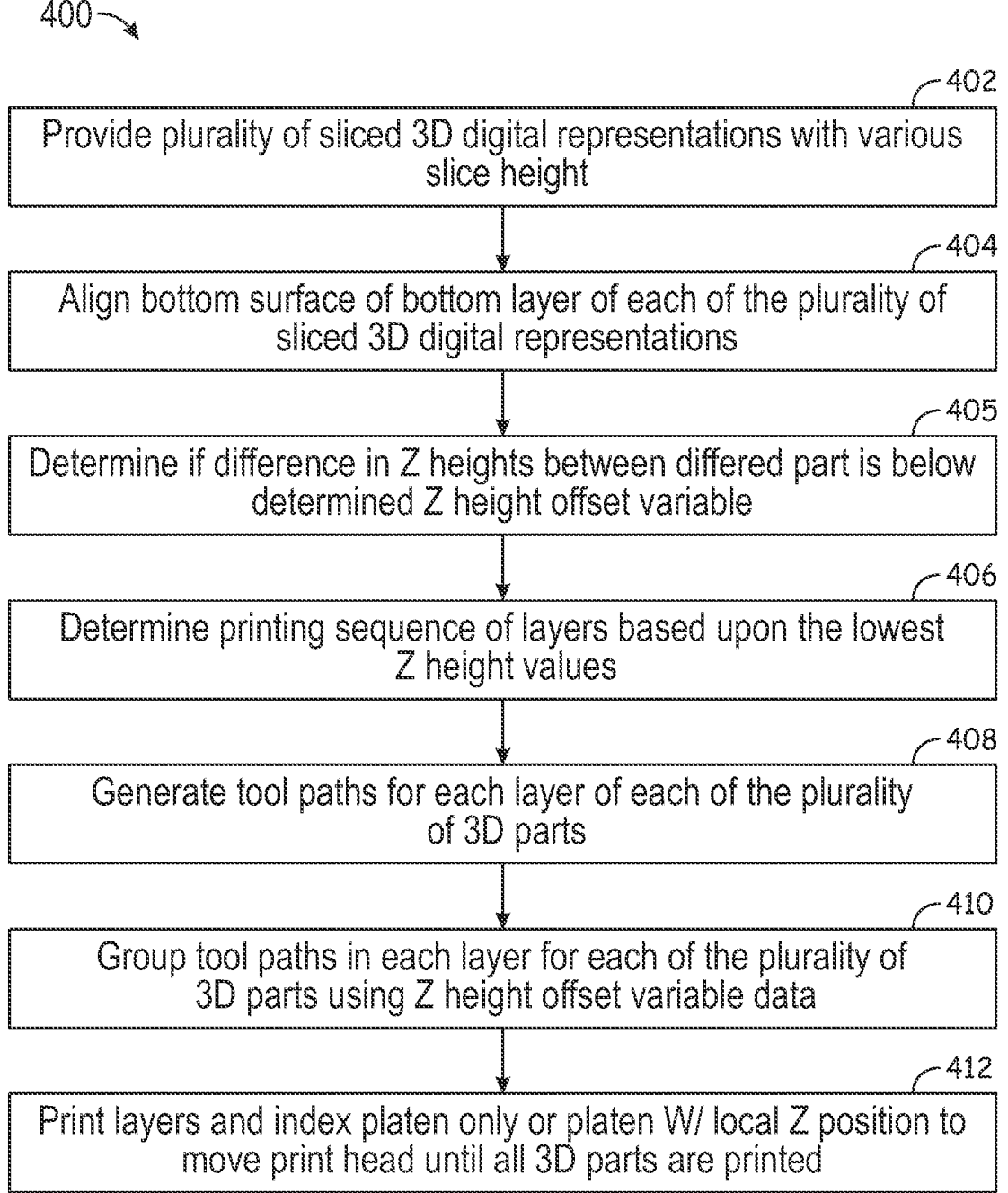

400

402
Provide plurality of sliced 3D digital representations with various slice height 404
Align bottom surface of bottom layer of each of the plurality of sliced 3D digital representations 405
Determine if difference in Z heights between differed part is below determined Z height offset variable 406
Determine printing sequence of layers based upon the lowest Z height values 408
Generate tool paths for each layer of each of the plurality of 3D parts 410
Group tool paths in each layer for each of the plurality of 3D parts using Z height offset variable data 412
Print layers and index platen only or platen W/ local Z position to move print head until all 3D parts are printed

FIG. 9

METHOD OF CONCURRENTLY 3D PRINTING EXTRUDED PARTS HAVING DISSIMILAR SLICE HEIGHTS

BACKGROUND

The present disclosure relates to additive manufacturing systems for 3D printing of parts by material extrusion techniques. In particular, the present disclosure relates to a system and method of currently printing a plurality of parts on a single build platform. All references disclosed herein are incorporated by reference.

Additive manufacturing, also called 3D printing, is generally a process in which a three-dimensional (3D) part is built by adding material to form a part rather than subtracting material as in traditional machining. Using one or more additive manufacturing techniques, a three-dimensional solid part of virtually any shape can be printed from a digital model of the part by an additive manufacturing system, commonly referred to as a 3D printer. A typical additive manufacturing work flow includes slicing a three-dimensional computer model into thin cross sections defining a series of layers, translating the result into two-dimensional position data, and transmitting the data to a 3D printer which manufactures a three-dimensional structure in an additive build style. Additive manufacturing entails many different approaches to the method of fabrication, including material extrusion, ink jetting, powder bed fusion, binder jetting, direct energy deposition, electrophotographic imaging, and vat photopolymerization (including digital light curing and stereolithographic processes).

In a typical extrusion-based additive manufacturing system (e.g., fused deposition modeling systems developed by Stratasys, Inc., Eden Prairie, MN), a part may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is heated to a molten pool. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and is removable from the completed printed part when the printing process is complete.

A multi-axis additive manufacturing system may be utilized to print parts using fused deposition modeling techniques. The multi-axis system may include a robotic arm movable in multiple degrees of freedom. The multi-axis system may also include a build platform movable in two or more degrees of freedom and independent of the movement of the robotic arm to position the part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the part. The multiple axes of motion can utilize complex tool paths for printing parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to print layers of a part in a single build plane, the geometry of part features may be used to determine the orientation of printing.

There is a desire to maximize throughput of the printer by filling the build platform with a multiplicity of dissimilar parts in a single build job.

SUMMARY

An aspect of the present disclosure relates to a method of printing a plurality of parts in a material extrusion 3D printer. The method includes providing a plurality of sliced 3D digital representations of a plurality of parts with varying slice heights in the Z direction, and positioning the digital representation of parts on a build platform of the 3D printer. The method includes determining a printing sequence of the layers of the plurality of parts utilizing the steps of comparing the Z height of the next layer of each of the plurality of sliced 3D presentations of the plurality of parts, selecting a part of the plurality of parts that has the lowest Z height value and sequencing layers of the plurality of parts based upon the lowest Z height value. The method includes repeating the comparing, selecting and sequencing steps until each of the sliced layers of each 3D digital representations of the plurality of parts has been sequenced. The method includes extruding a layer of the plurality of parts with one or more print heads based upon the determined printing sequence to print the plurality of parts and then indexing a Z height between the sequenced layers. The method includes repeating the extruding and indexing steps until each of the plurality of parts is printed.

Another aspect of the present disclosure relates to an extrusion-based additive manufacturing system. The extrusion-based additive manufacturing system includes a plurality of print heads configured to extrude thermoplastic based material, a platen that moves in a z direction and a software program. The software program is configured to receive a plurality of digital representations of a plurality of parts sliced in the Z direction at varying slice heights, position the digital representation of the plurality of parts on a build platform of the 3D printer and determine a printing sequence of the layers of the plurality of parts based upon a lowest Z height between the plurality of digital representations. The print sequence is determined utilizing the steps of extracting and comparing the Z height of the next layer of each of the plurality of representations of the plurality of parts, and selecting the layer that has the lowest Z height value to extrude next. The print sequence process of extracting, comparing and selecting is repeated until each layer of each 3D digital representations of a plurality of parts has been sequenced. The extrusion-based additive manufacturing system includes a controller configured for controlling the at least one print head and the platen based upon the determined sequence to extrude a flow of in layers based to print the plurality of parts in a single print job.

Another aspect of the present disclosure includes a method of printing a plurality of parts in a material extrusion 3D printer. The method includes providing a plurality of sliced 3D digital representations of a plurality of parts with varying slice heights in the Z direction and positioning the digital representation of parts on a build platform of the 3D printer. The method includes determining a printing sequence of the layers of the utilizing the steps of provide a determined Z height offset value in which a plurality of layers of disjoined parts can be printed without adjusting a Z height within the 3D printer, comparing the Z height of the next layer of each of the plurality of sliced 3D presentations of the plurality of parts, selecting a part of the plurality of parts that has the lowest Z height value, sequencing layers of the plurality of parts based upon the lowest Z height value and determine whether a Z height difference between adjacent layers within the determined print sequence is below the determined Z height offset value. The method includes repeating the comparing, selecting and sequencing steps until each of the sliced layers of each 3D digital representations of the plurality of parts has been sequenced. Once the layers of the plurality of parts is sequenced, the method includes extruding a layer of the plurality of parts with one or more print heads based upon the determined printing sequence to print the plurality of parts, indexing a z height between the sequenced layers. The method includes repeating the extruding and indexing steps until each of the plurality of parts is printed.

BRIEF DESCRIPTION OF THE DRAWINGS

FIG. 7 is a flow chart for print a plurality of parts having varying slice heights in a single print job in indexing a platen in a Z direction.

FIG. 8 is a flow chart for print a plurality of parts having varying slice heights in a single print job by indexing a platen and/or moving a print head in a Z direction.

FIG. 9 is a flow chart for print a plurality of disjoined 3D parts having varying slice heights in a single print job utilizing a determined Z height offset variable between adjacent layers in a print sequence.

DETAILED DESCRIPTION

Figure 1:
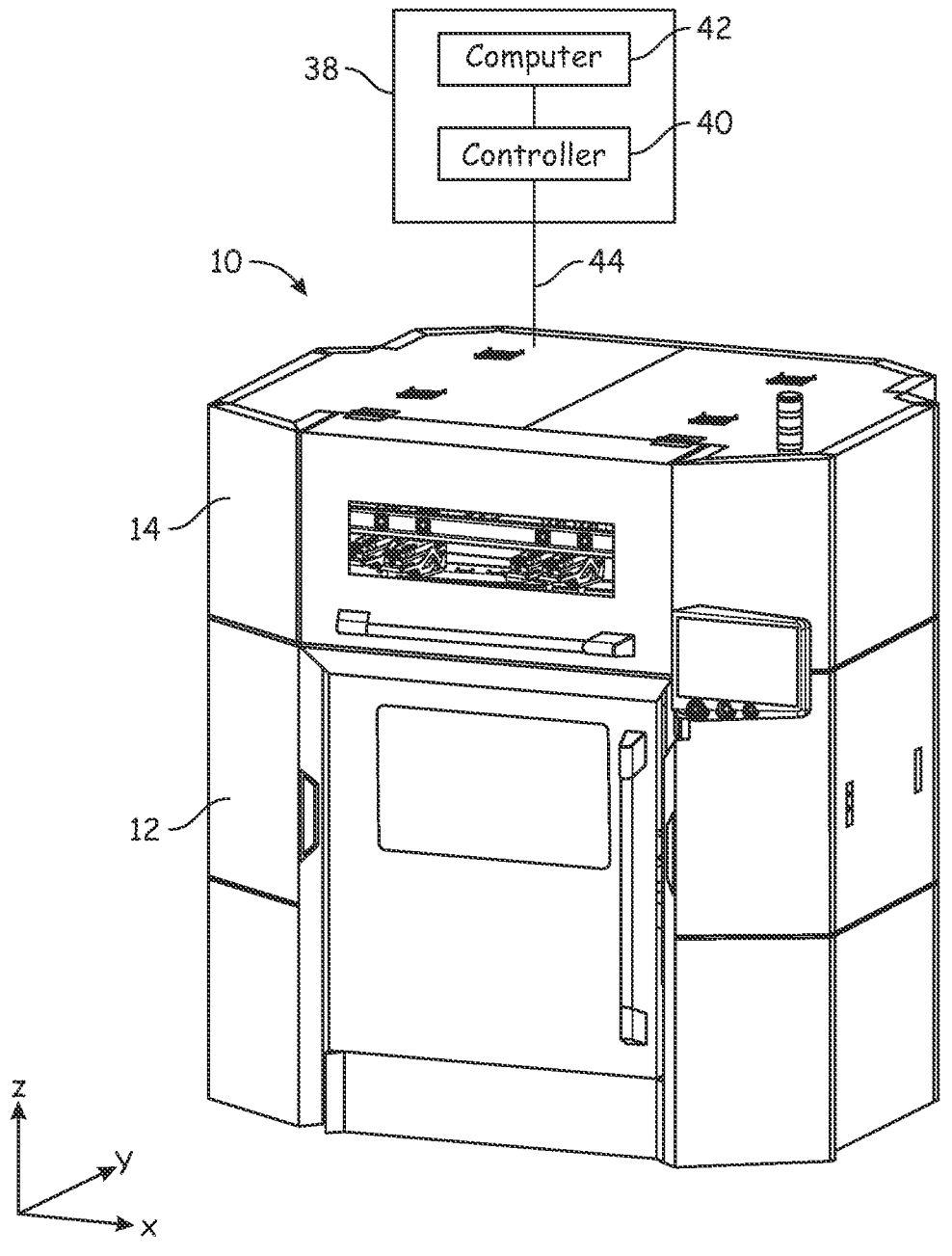
FIG. 1 is a perspective view of an extrusion-based 3D printer of the present invention having a traditional XY gantry, and a heated build chamber positioned below a tool chamber.
Figure 2:
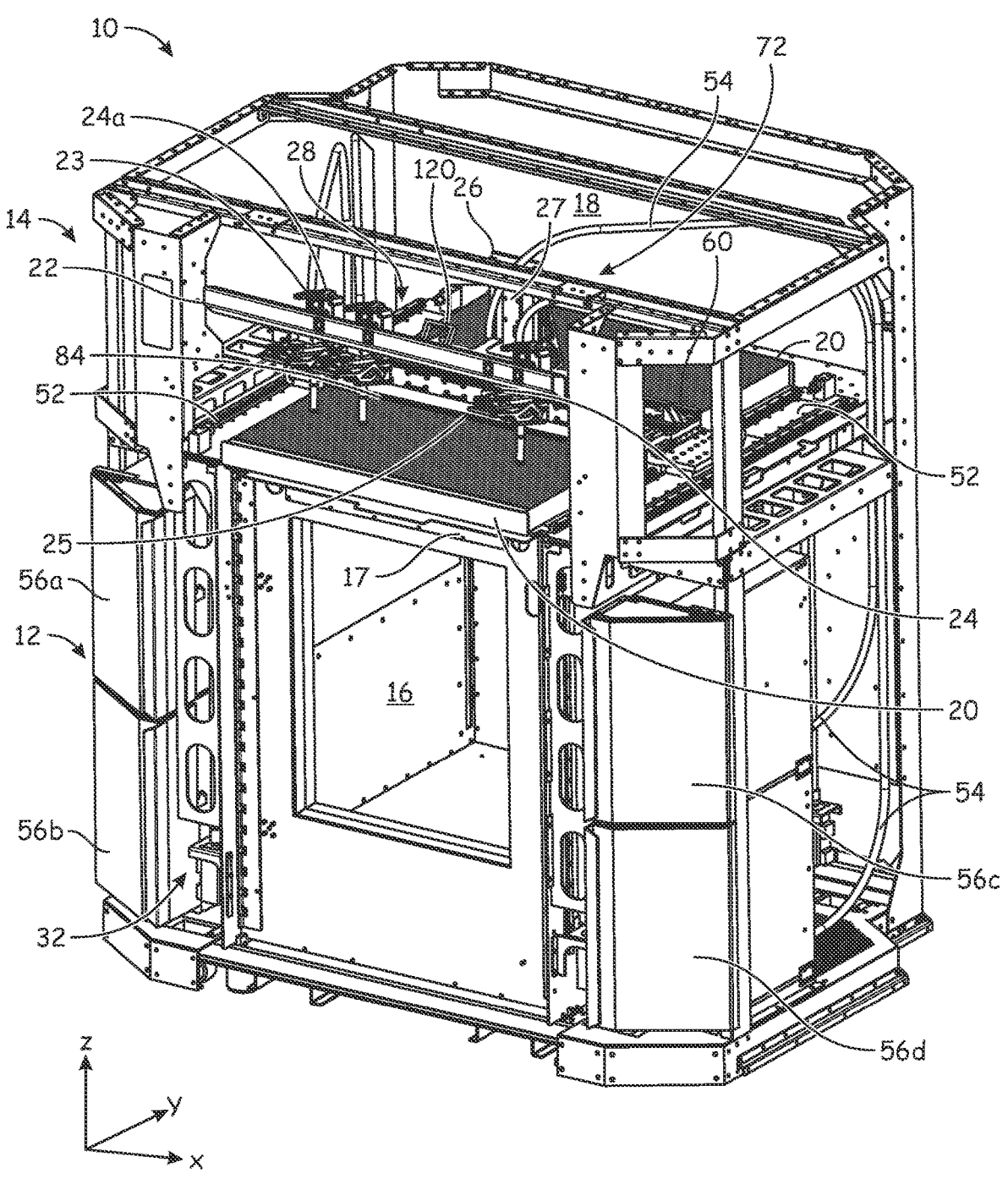
FIG. 2 is a perspective view of portions of the 3D printer shown in FIG. 1, with portions of the frame or cabinet removed to illustrate separation of the build and tool chambers and other features in greater detail.

The present disclosure relates to systems and methods of concurrently printing a plurality of parts in a single 3D printer on one platen which moves in the Z direction. In some embodiments, at least two of the plurality of parts have dissimilar sliced layer heights. In the present disclosure, digital models or representations of a plurality of parts are provided to a control program, where each of the digital models are sliced in the Z direction. A common build surface for each of the parts is defined, and thereafter the sliced layers for the plurality of digital representations for the plurality of 3D parts are compiled or sequenced based upon Z height to determine the sequence in which the layers of the plurality of typically disjoined 3D parts are to be printed. The plurality of 3D parts is printed on a shared platen using a common z gantry, while utilizing extruded layer thickness control for each print head. The extruded layer thickness control also includes, but not limited to, a unique and local z gantry for each printing device, variable flow control for each print head and combinations thereof.

The steps in which the layers are printed includes positioning the digital representation of parts on a build platform of the 3D printer using a print preparation software, determining which prior printed layer is at the lowest collective elevation relative to other parts and sequencing the toolpaths within the parts. The steps include determining how to move the print head(s) without interference from other partially printed parts, and determining how to index the part or print head in the z direction so that the plurality of parts can be concurrently printed. Once the sequence and tool paths in which the layers of the plurality of parts are printed and the distance of indexing in the z direction is determined, the control program can optionally decompile the combined slices of the plurality of part models back into the individual electronic models of the respective parts.

Based upon the capabilities of the 3D printers, the sequential indexing in the z direction to prevent interference between the print head and one or more parts being printed can be controlled by only moving the shared or common platen in the z direction. The presently disclosed system and method can therefore be utilized on any 3D printer that utilizes only platen-based z height control. Additionally, if the 3D printer includes movement control of the print head(s) in the z direction by utilizing a local Z gantry, the system and method can use a combination of movement of the platen and movement of the print head in the z direction to control the sequential printing of the layers of the plurality of disjoined parts until each of the plurality of disjoined parts is printed, with their own unique layer slice heights.

In some embodiments, the layer height is controlled using the same print head by varying extruded flow rate, speed of the print head or combinations thereof. By way of example, if the thickness of the layer height is to be increased, the flow rate can be increased while maintain substantially the same print head XY travel speed. The thickness of the layer can alternatively or in addition be controlled by maintaining flow rate and slowing or increasing the print head XY travel speed. Also, a combination of adjusting flow rate and speed of the print head can also be used to control and vary the layer thickness.

In other embodiments, where print heads or tools can be swapped out in the 3D printer, the layer height can be controlled using different print heads with different extrusion flow rate capabilities. Flow rate control and speed control of the print head can additionally be utilized to control layer height in 3D printers that have the capability of swapping print heads.

It is desirable to fabricate multiple parts at once by packing the platen to achieve maximal throughput. In current available systems, part packing opportunities are limited because the layer height or layer resolution needs to be identical for each of the parts on the build substrate. The present disclosure allows a plurality of disjoined parts or components of a part to be concurrently printed, even with different layer heights. The ability to concurrently print parts of different layers heights provides increased homogenous properties across the parts because the same material can be used to print the parts at substantially the same process conditions. As such, variations in part qualities or properties can be minimized which increases part quality, especially for sub-components of a larger part.

The present disclosure may be used with any suitable additive manufacturing system, commonly referred to as a 3D printer. For example, FIGS. 1-5 illustrate a 3D printer 10 having features as discussed above. FIG. 1 is a perspective view of the 3D printer enclosed in cabinets. FIGS. 2-5 are perspective views or side views of the 3D printer with portions removed to illustrate internal features more clearly, indicating the platen gantry 32 that moves the platen 30 in the Z direction, in addition to multiple print heads with a x-y gantry 28 with a local z positioner 72. As shown initially in FIGS. 1 and 2, 3D printer 10 includes a build chamber cabinet 12 housing a heated build chamber 16 and a tool chamber cabinet 14 housing a separate tool chamber 18, with the tool chamber positioned on top of the build chamber. The tool chamber 18 houses multiple tools, in a tool rack 22, including selectable print heads 24. The 3D printer 10 includes a print head carriage and local Z positioner 72 which connects or couples to a selected tool or print head, with an x-y gantry 28 moving the carriage 26 and a selected print head in an x-y plane above a build plane, and the local Z positioner 72 is able to locally move its print height in z, as well as insert it into the heated build chamber 16. The build plane is provided by a platen or platen assembly 30 (shown in FIGS. 4-5) within the build chamber 16, with the platen 30 being moved in a vertical z direction within the build chamber by a platen gantry 32. The platen 30 may be constructed of a single plate or may be an assembly of two or more plates or platens operated in unison. The tool chamber 18 and heated build chamber 16 are separated by an insulator 20, described below in greater detail, which allows a nozzle 25 of a selected print head 24 to extend from the tool chamber 18 into the heated build chamber 16 such that the build environment can be maintained an elevated temperature while not requiring the same elevated temperature for the electronic portions of the print heads in tool chamber 18.

In the exemplary embodiment of 3D printer 10, a print head 24 is shown engaged on a tool mount 27 of the carriage and has an inlet 23 for receiving a consumable build material and a nozzle 25 for dispensing the build material onto the platen 30 in a flowable state. The consumable build material is provided to the print head from one or more filament spools 50 positioned within spool boxes 56 positioned on a side of the build chamber, and through filament guide tubes 54 extending from the spool boxes to the print head.

Figure 3:
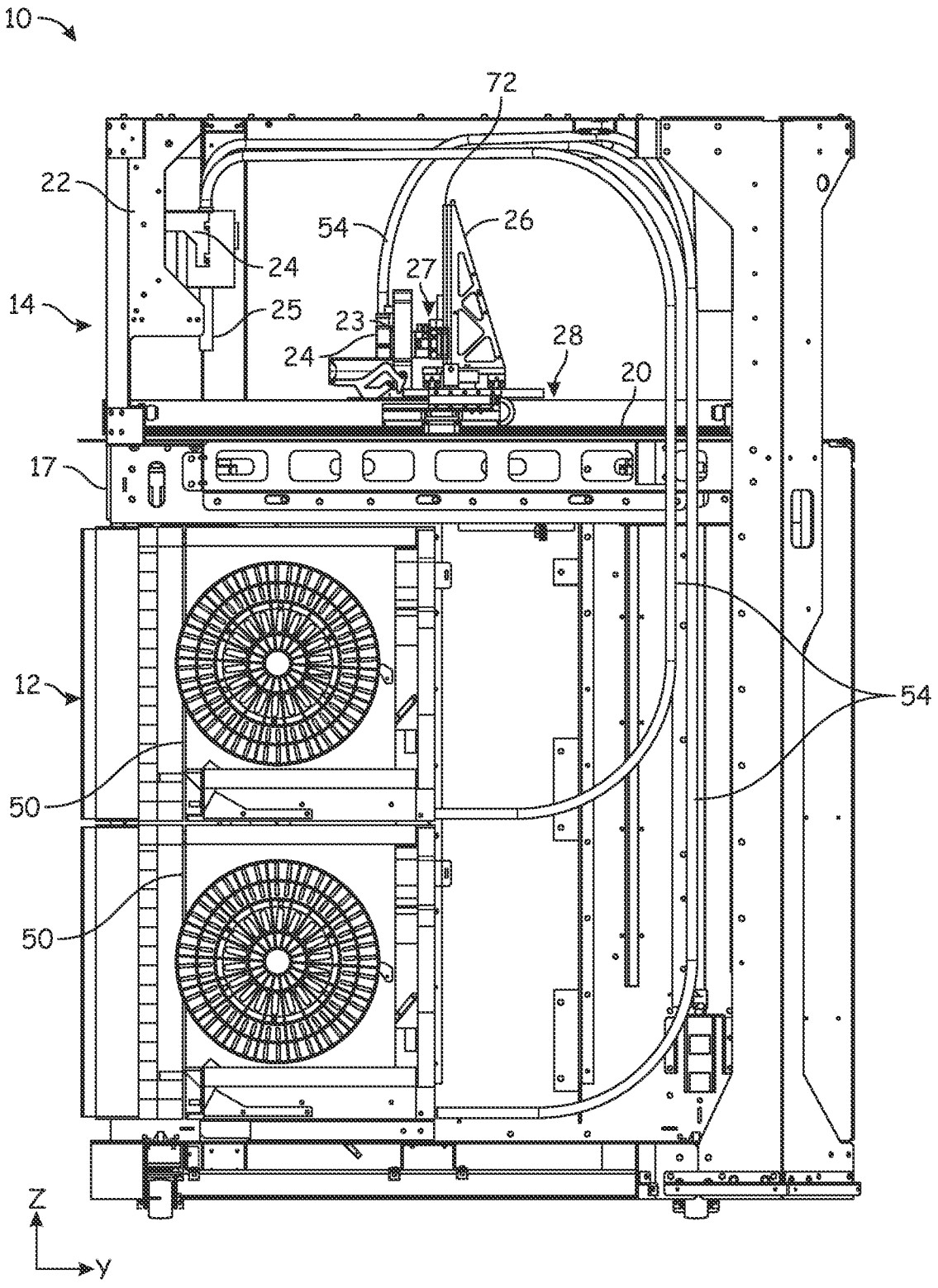
FIGS. 3-5 are views of the 3D printer shown in FIG. 1, illustrating filament spool cabinets, x-y gantry and local Z positioner features, and an insulator separating the build and tool chambers.
Figure 4:
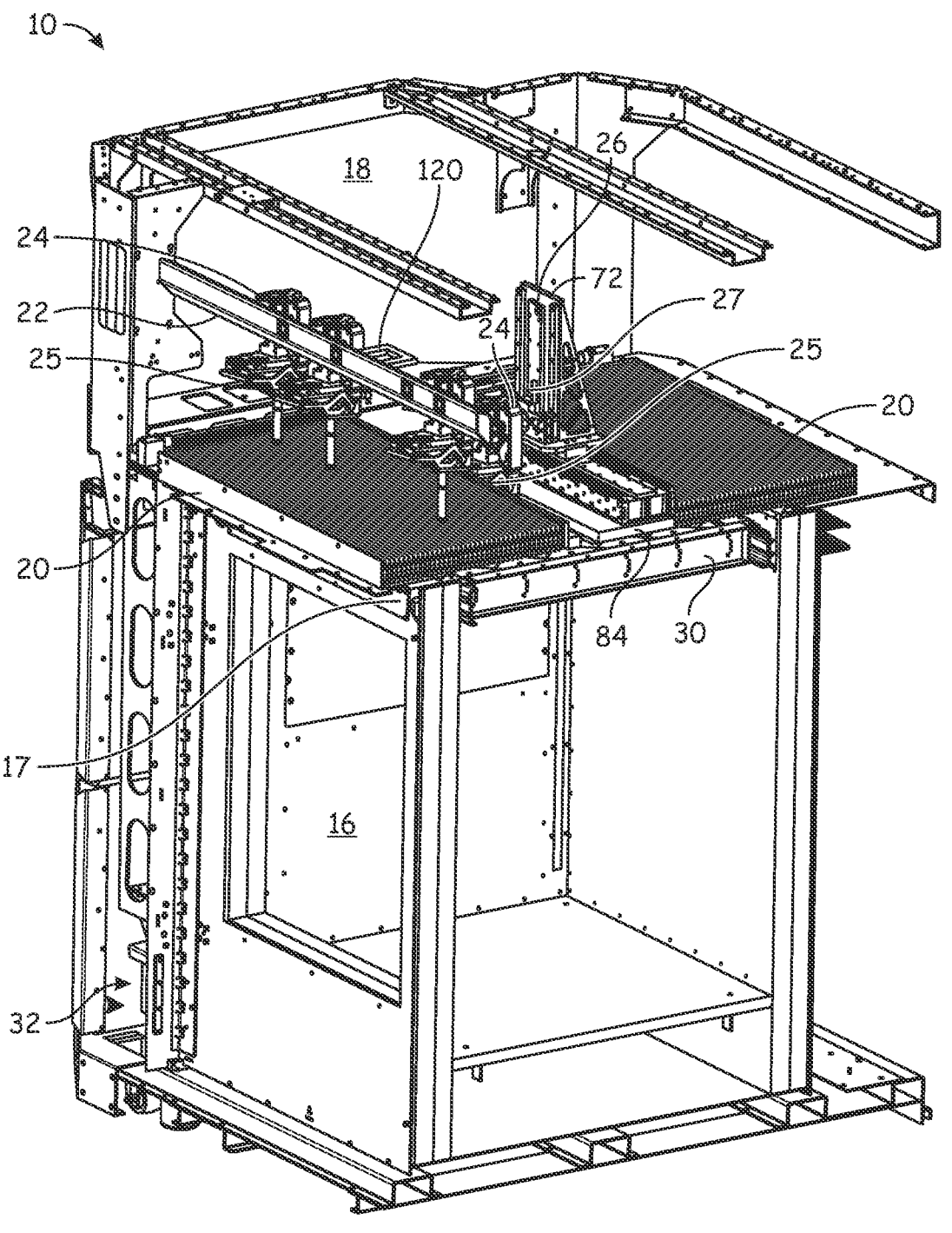
Figure 5:
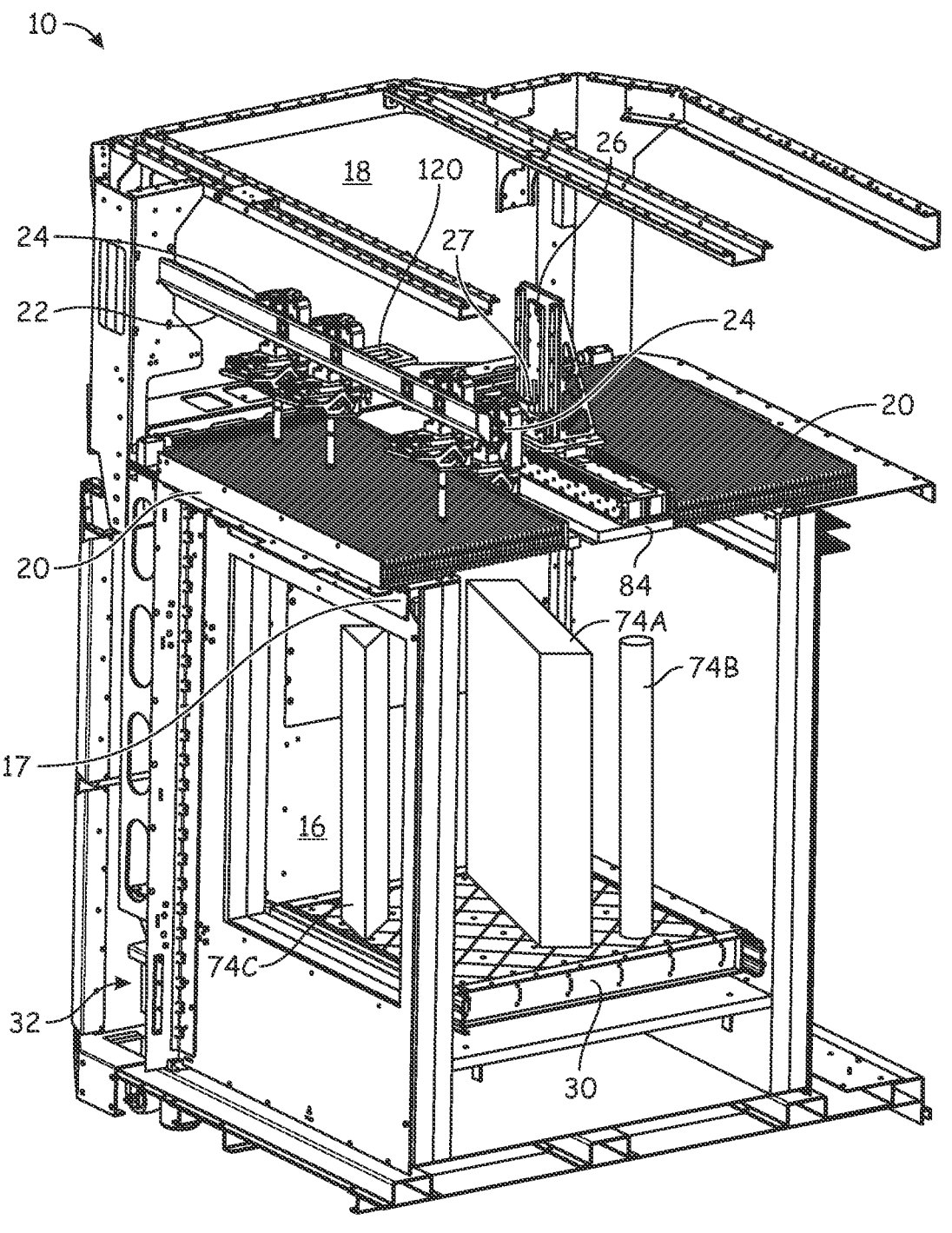

As shown in FIGS. 3-5, the x-y gantry 28 is mounted on top of the build chamber, and in an exemplary embodiment comprises an X-bridge 60, Y-rails 52, and associated X and Y motors for moving and positioning the carriage 26 (and any build tool installed on the carriage) in an x-y plane above the build plane. The carriage is supported on the X-bridge and includes a mount 27 for receiving and retaining print heads and a local Z positioner 72 for controllably moving a retained print head out of the x-y build plane along a perpendicular z direction axis (e.g., not in a pivoting manner). The local Z positioner 72 operates to move a retained print head in a limited Z band of motion from a build position to a tool change position, and in some embodiments may be utilized while the carriage is moving in x-y or when it is in a fixed x-y position. The x-y gantry, as well as the local Z positioner, can utilize any suitable motors, actuators or systems to move the carriage and print head in the x, y and z directions as discussed.

The print head tool crib or rack 22 is located above the build chamber at a position reachable by the tool mount 27 when elevated by the local Z positioner 72. The tool mount may engage with and support a print head, and is used to retain and swap print heads provided in the rack. In general, any modular tools, such as print heads or any other tools (generally and collectively referred to below simply as "tools") that are removably and replaceably connectable to a 3D printer may be stored in bins of a tool rack for managing tool inventory and interchanging tools during operation of the 3D printer. The local Z positioner 72 is utilized for picking and placing tools in the bins so that the 3D printer can interchangeably use the various modular tools contained in the tool rack. The tool rack may be any suitable combination of containers or other defined spaces for receiving and storing tools.

3D printer 10 also includes controller assembly 38, which may include one or more control circuits (e.g., controller 40) and/or one or more host computers (e.g., computer 42) configured to monitor and operate the components of 3D printer 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to system 10.

Controller assembly 38 may communicate over communication line 44 with print head 24, filament drive mechanisms, chamber 16 (e.g., with a heating unit for chamber 16), head carriage 26, motors for platen gantry 32 and x-y or head gantry 28, motors for local Z positioner 72, and various sensors, calibration devices, display devices, and/or user input devices. In some embodiments, controller assembly 38 may also communicate with one or more of platen assembly 30, platen gantry 32, x-y or head gantry 28, and any other suitable component of 3D printer 10. While illustrated as a single signal line, communication line 44 may include one or more electrical, optical, and/or wireless signal lines, which may be external and/or internal to 3D printer 10, allowing controller assembly 38 to communicate with various components of 3D printer 10.

During operation, controller assembly 38 may direct platen gantry 32 to move platen assembly 30 to a predetermined z height within chamber 168. Controller assembly 38 may then direct x-y gantry 28 to move head carriage 26 (and the retained print head 24) around in the horizontal x-y plane above chamber 16, and direct the local Z positioner 72 to move the head carriage in the z direction relative to the x-y plane, in addition to the platen gantry z movement. Controller assembly 38 may also direct a retained print head 24 to selectively advance successive segments of the consumable filaments from consumable spools 50 through guide tubes 54 and into the print head 24. It should be noted that movements commanded by the controller assembly 38 may be directed serially or in parallel. That is, the print head 24 can be controlled to move along the x, y and z axes by simultaneous directing the x-y gantry 28 and the local Z positioner 72 to re-position the head carriage 26 along each axis.

At the start of a build process, the build plane is typically proximate a top of the print chamber, printing on the top surface of the build platform or platen 30 (or a top surface of a build substrate mounted to the platen) as shown in FIG. 4, where the build platform is positioned to receive an extruded material from the nozzle 25 of the print head. As layers are built, the platen is indexed away from the build plane, allowing printing of a next layer in the build plane. The platen gantry 32, or primary Z positioner, moves the build platform away from the print plane in between the printing of layers of a 3D fabricated parts 74A, 74B and 74C all at substantially a same height (shown in FIG. 5). One or more parts and associated support structures can be printed in a layer-by-layer manner by incrementally lowering the platen in the z direction. FIG. 5 illustrates portions of 3D printer 10 with the platen 30 at a lowered position, achieved through numerous incremental z direction repositioning steps while printing.

As discussed, the build chamber 16 of the 3D printer may optionally be heated to provide a heated or ovenized build environment, such as in the case of FDM® 3D printers manufactured and sold by Stratasys, Inc. of Eden Prairie, MN. The heated build chamber is provided to mitigate thermal stresses and other difficulties that arise from the thermal expansion and contraction of layered build materials during fabrication of a part, using methods such as are disclosed in U.S. Pat. No. 5,866,058. The insulator 20 shown in FIGS. 2-5 can be a deformable thermal insulator which allows the x-y gantry to move the head carriage 26 and attached print head 24 to move in the x-y plane. An example of a deformable thermal insulator 20, which allows one or more print heads 24 to access the build chamber while the print head's electronic portions remaining outside the build chamber. Print heads 24 move in the x-y plane while minimizing heat loss from the build chamber 16 into the tool chamber 22, as disclosed in Stratasys U.S. Pat. No. 7,297, 304. A bellows tray 84 or similar mechanism is provided between sections of the overall deformable insulator, to provide access for the nozzle 25 of the print head to enter into the heated build chamber while maintaining the heat ion within the build chamber and preventing heat leakage to the tool chamber. The bellows tray 84 moves in the y-direction as the x-y gantry 28 moves the print head carriage, and the sections of deformable thermal insulator 20 on either side of the bellows tray move or deform accordingly to maintain the thermal insulation between chambers to accommodate the print head carriage movement.

Figure 6:
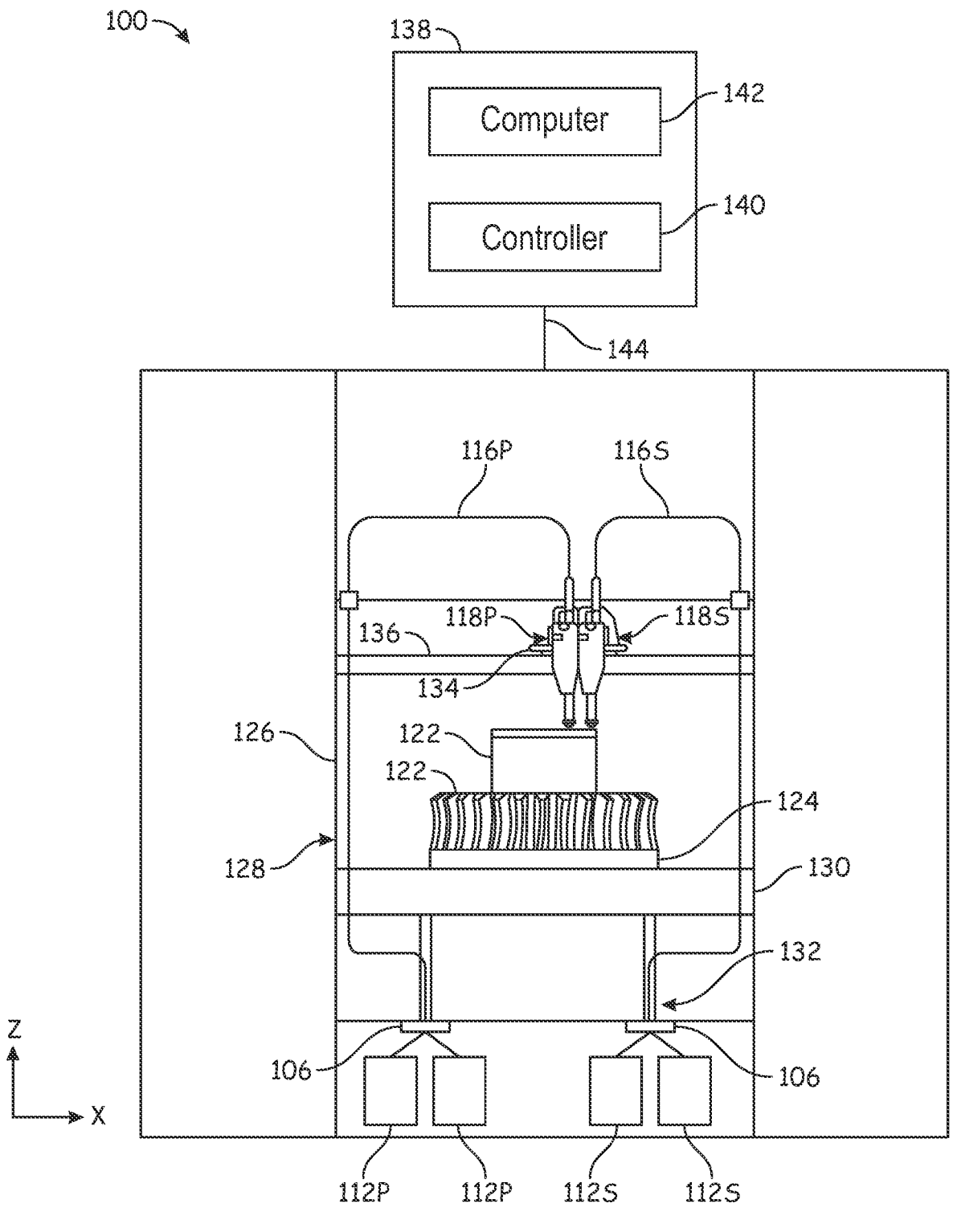
FIG. 6 is a schematic view of a 3D printer that is configured to print in a plane.

The present disclosure can also be used with a 3D printer wherein the print heads only move and prints in a plane and indexes a platen in a direction normal to the plane. For example, FIG. 6 illustrates a schematic view of an exemplary 3D printer 110 that has a substantially horizontal print plane, and where the part is printed and indexed in a substantially vertical direction, without the use of a local Z height gantry. Parts are printed in a layer by layer manner using two mounted print heads 118*p* for part material and 118*s* for support material or printed with part material alone. The illustrated 3D printer 110 uses four consumable assemblies, two consumable assemblies 112*p* for part material and two consumable assemblies 112*s* for support material. Each consumable assembly 112*p* and 112*s* is a removable, and replaceable supply device such that dual supplies of consumable filament of part material and dual supplies of consumable material for support material can be retained and utilized in a single 3D printer 110. All of the consumable assemblies 112*p* and 112*s* may be identical or different in composition. While four assemblies are illustrated, the present disclosure is not limited to a 3D printer with four assemblies. Rather, the 3D printer of the present disclosure can utilize any number of assemblies including two or more assemblies containing the same or different consumable materials.

As shown, the 3D printer 110 includes system cabinet or frame 126, chamber 128, platen 130, platen gantry 132, head carriage 134, and head gantry 136. Cabinet 126 may include container bays configured to receive consumable assemblies 112*p* and 112*s*. In alternative embodiments, the container bays may be omitted to reduce the overall footprint of 3D printer 110. In these embodiments, consumable assembly 112 may stand proximate to printer 10.

Chamber 128 contains platen 130 for printing part 122 and support structure 124. Chamber 128 may be an enclosed environment and may be heated (e.g., with circulating heated air) to reduce the rate at which the part and support materials solidify after being extruded and deposited (e.g., to reduce distortion and curling). A typical chamber includes a thermal insulator that allows the print heads 118*p* and 118*s* to be located outside the heated space, while moving in a heated build envelope, and printing in a plane, whether x-y, x-z or y-z depending upon the configuration of the printer.

Typical layer-based FDM® printers utilize a build tray to print parts in a print job, with each of the parts being printed sliced at the same layer height and sharing the same layer height for any particular Z increment movement. The print head travels from one part to the next to complete layer addition. Once a layer is printed for each part, the platen is then indexed in the z direction and the next layer is printed. The process is continued until each part is printed.

The present disclosure allows disjoined parts of varying slice heights to be concurrently or simultaneously printed in a single 3D printer where at least the platen moves in a shared z direction movement, or otherwise stated the direction of build of the parts. For example, one part has a constant slice height of X, while another part on the same build platen has a constant slice height of Y, where X and Y have different values. In another example, one or more of the parts being concurrently printed is sliced using an adaptive slicing algorithm wherein a unique distribution of layer thicknesses is generated to optimize resolution for specific part geometries. An adaptive height layer slicing technique is disclosed in Stratasys, Inc. Published Application No. US20180043631. In yet another example, one or more of the parts is sliced using an algorithm that scales layer thickness to accommodate predicted part shrinkage caused by thermal expansion and contraction of the extruded material (referred to as "Z shrink"). Parts processed for the same material, print head nozzle and slice height, but with different Z shrink values produce a different distribution of Z layer heights and cannot be successfully printed using a universal Z height. The present disclosure is utilized for combining multiple layer-based additive manufacturing parts into a single build operation by sequencing using layer index based upon Z height.

When different layer heights are used to print the plurality of disjoined parts, the sequence of layers to be printed is selected by choosing the lowest layer in the Z direction from each of the plurality of disjoined parts that has not yet been built (extruded). Each of the plurality of disjoined parts is built following the strict sequence of layers, from layer 1 to layer n for each of the plurality of disjoined parts. During the print job building process, the next layer to extrude for each of the parts in the print job is determined by examining each of the next layer to be extruded for all of the plurality of parts in the print job and choose the layer that has the lowest Z height.

By way of example, when printing three parts with three different layer height distributions the following workflow is utilized. The parts will be referred to as Part A, Part B, and Part C. Each part is comprised of a stack of layers that are built in sequence from layer 1 to layer n. Each layer contains one or more toolpaths which will be numbered within the layer starting with toolpath 1. A specific toolpath is described by referencing the part name, the layer index, and the toolpath index within the layer.

Part A contains the following layers and toolpaths:

Layer A-l1
    Toolpath A-l1t1
    Toolpath A-l1t2
    . . .
    Toolpath A-l1tn
Layer A-l2
    Toolpath A-l2t1
    Toolpath A-l2t2
    . . .
    Toolpath A-l2tn
. . .
Layer A-1n
    Toolpath A-lnt1
    Toolpath A-lnt2
    . . .
    Toolpath A-lntn This structure of layers and toolpaths are repeated for parts B and C. The approach is easily generalized to n parts, each with a unique distribution of layer heights. Once the tool paths are created, the plurality of disjoined parts can be printed. However, a precondition for starting the printing of the next layer is that all of the prior layer must be printed.

The present disclosure utilizes the following general steps to identify the next layer to print when print multiple parts, parts A, B and C. The first step is to identify the Z height of the next layer for part A, the Z height for the next layer for part B, and the Z height for part C. The next step includes choose the part that yields the lowest Z value followed by the step of building the toolpaths for the part with the lowest layer Z height value. The previous steps are repeated until all of the layers of the all parts have been built.

A more detailed work flow for the printing of three parts A, B and C with variable slice heights is as follows. First, variables to specify the next layer to print for each part are initialized. The initial value for these variables will always be the lowest/first layer of each part. A sentinel value will be used when all layers for a part have been built (depleted).

a. NextLayerA=A-l1
    b. NextLayerB=B-l1
    c. NextLayerC=C-l1

Next an inquiry is made whether all of the layer of all of the parts A, B and C have been built. The next layer of indices i, j and k are used to represent the next layer index for parts A, B and C respectively. The Z heights for the next layer are then determined as follows:

a. Layer Z height part A=LayerZ(A-li)
    b. Layer Z height part B=LayerZ(B-lj)
    c. Layer Z height part C=LayerZ(C-lk)

The minimum Z height value is then selected of the remaining Z height values for the next layer to be printed. By way of example, part B is selected as the part with the minimum Z height value for the next layer B-lj. The layer B-lj is the printed based upon the toolpaths:

a. Toolpath B-ljt1
    b. Toolpath B-ljt2
    c . . .
    d. Toolpath B-ljtn

Part B is then incremented to the next layer (j+1) which correlates to B-l(j+1). Once part B is incremented to the layer B-l(j+1) the above loop is repeated for all three parts A, B and C to select and print the layer with the lowest Z height of the three parts, A, B and C. The process is then repeated until all of the layers of all of the parts A, B and C are printed.

When printing parts with a single material and an optional support material, the sequence typically includes printing the part layers followed by the support material for a layer of a part followed by the printing of the support material followed by the part material for the next printed layer to minimize print head swaps during the printing process. The pattern is repeated until all of the layers of all of the parts are printed. The pattern of printing can also begin with the printing of support material followed by part material in a layer followed by part material followed by support material in the next layer. The pattern is continued until all of the layers in all of the parts are printed.

If parts with dissimilar layer heights were printed on the same platen, with incremental layer heights that were common multiples of each other (for example 1×, 2×, or 3×), then it would be somewhat easier to coordinate the movement of the platen in z. However, when the layer heights of unique and separate parts are not multiple increments that would allow particular parts to receive a layer, or skip a layer during a particular platen movement, then it can become quite difficult to accommodate different layer thickness of the parts being printed with the inconsistent layer height of the parts during a single print job.

Referring to FIG. 7, a method of determining the sequence of printing layers of a plurality of disjoined parts in a single 3D printer on one print tray, that prints planar layers in the XY print plane, and indexes the common or shared platen in a Z direction normal to the print plane is illustrated at 200. The method includes providing a plurality of sliced 3D digital representations of parts, where at least two of the plurality of sliced 3D digital representations of printed parts have dissimilar and often incompatible multiples of slice height of different thicknesses in the Z direction at step 202. At step 204, a bottom surface of each of first layer of each the plurality of digital representations is aligned on a single platen with a print preparation software. The Z heights of each of the plurality of layers of each of the disjoined 3D parts are then determined and compared at step 204 and then a sequence for printing the layers is determined based upon the lowest Z height of a first part followed by the next lowest Z height of a second part and so on for all of the layers, until the sequence for printing all of the layers for the plurality of disjoined parts is determined at step 206.

Toolpaths for each of the layers is generated at step 208 and the sequence of printing the parts based upon the toolpaths is determined as step 210. In some instances, the sequence of printing the plurality of disjoined 3D parts is determined based upon the layers of the parts and required support structure. In other instances, the sequence of printing the plurality of disjoined 3D parts is determined based upon the part material used to print the parts and required support structure.

Once the layer printing sequence and the toolpath sequence for each layer is determined, the layer with the lowest Z height is printed followed by the layer with the next lowest layer until the determined sequence of printing of the layers of the plurality of disjoined parts is completed at step 212 by indexing the platen in the 3D printer the Z distance between the layers in the determined sequence.

Referring to FIG. 8, a method of determining the sequence of printing layers of a plurality of disjoined parts is a single 3D printer that includes a print head that moves in more than a x-y plane and indexes the platen in a Z direction normal to the plane is illustrated at 300. The method 300 includes similar steps 302-310 as disclosed in the steps 202-210 in the method 200. The method 300 differs from the method 200 in that at step 312, the location of the extruder for printing the next layer can be adjusted by lowering the platen or raising the print head(s) using the local Z positioner 72. In some instances, when the weight of the parts becomes heavy, indexing the Z height using the local Z position 72 can save on the useful life of the actuators used to move the platen and the parts being printed.

Referring to FIG. 9, a method of determining printing sequences of a plurality of 3D parts utilizing the compatible Z height offset variable is illustrated at 400. Steps 402, 404, 406 and 408 are similar to the steps 202, 204, 206 and 208. However, the method 400 includes the step of determining if the difference in Z heights between layers of different parts is below a determined Z height offset variable at step 405. If the Z height of layers of two disjoined 3D parts are below the Z height offset variable, then toolpaths of the disjoined 3D parts can be grouped at step 410 to increase efficiency and part quality. The variation in thickness height can be accounted for by adjusting extrusion flow rate, print head velocity or combinations thereof. Once the toolpaths are grouped, the parts are printed at step 412 by indexing the platen in the Z direction or indexing the platen along with moving the print head in the Z direction until the plurality of 3D parts are printed.

EXAMPLES

The present disclosure is more particularly described in the following examples that are intended as illustrations only, since numerous modifications and variations within the scope of the present disclosure will be apparent to those skilled in the art. The following examples illustrated the part layers in millimeters, which is being done for illustrative purposes. The layers can be any suitable heights that can be used to print parts with a 3D printer.

Example 1

Figure 10:
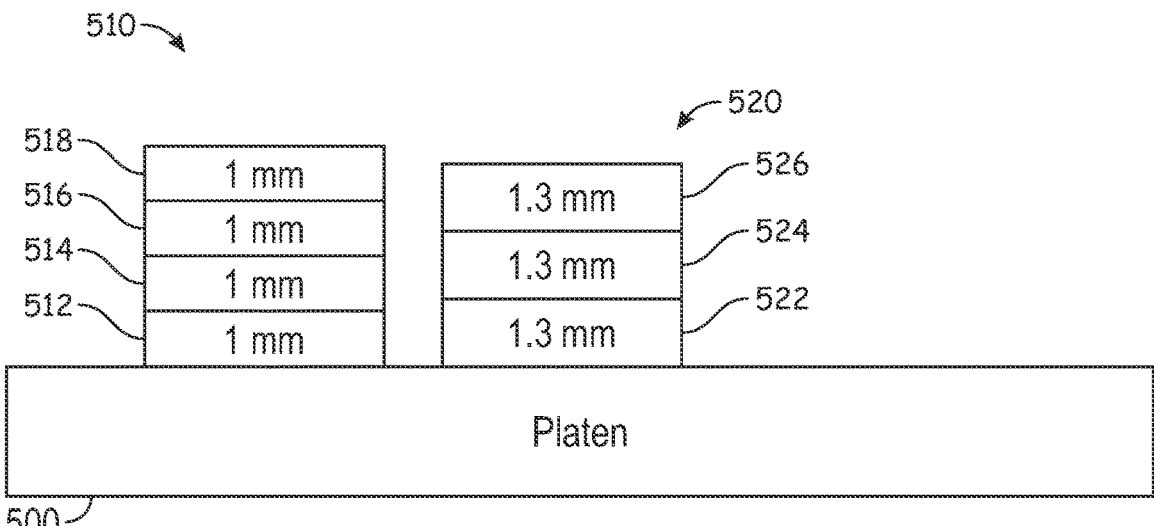
FIG. 10 is a schematic view of two parts of different slice heights being printed on the same platen.

A two-part build job where the two parts have differing layer heights is disclosed. Referring to FIG. 10, the layer sequencing for parts 510 and 520 is illustrated with a platen 500 moving in the Z direction. For purposes of example, the part 510 has been assigned a slice height value of 1 mm and the part 520 has been assigned a height value of 1.3 mm.

Using the above methodology, the Z heights of the first layers 512 and 522 of the parts 510 and 520 are compared. The layer 512 is selected to be printed because the Z height of the layer 512 is less than that of the layer 522. The platen 500 is incremented downwardly to allow the printing of the layer 512.

Once the layer 512 is printed, the Z height of the layer 522 in the part 520 is compared to the Z height of the layer 514 in the part 510. As the Z height of the layer 522 in the part 520 is less than the Z height of the layer 514 in the part 510, the platen 500 is incremented in the Z direction to allow for the printing of the layer 522.

Once the layer 522 is printed, a similar comparison in Z height is made between the layer 514 in the part 510 and the layer 524 in the part 520. As the Z height of the layer 514 in the part 510 is less than the Z height of the layer 524 in the part 520, the platen 500 is indexed to allow for the printing of the layer 514 in the part 510.

Once the layer 514 is printed, the Z height of the layer 524 in the part 520 is compared to the Z height in the layer 516 of the part 510. As the Z height of the layer 524 is less than the Z height of the layer 516, the platen 500 is incremented is indexed to allow for the printing of the layer 524 in the part 520.

Once the layer 524 is printed, a comparison of the Z height of the layer 516 of the part 510 is compared to the Z height of the layer 526 in the part 520. As the Z height of the layer 516 is less than the Z height of the layer 526, the platen 500 is indexed to allow for the printing of the layer 516 of the part 510.

Once the layer 516 of the part 510 is printed, a comparison of the Z height of the layer 526 in the part 520 is compared to the Z height of the layer 518 in the part 510. As the Z height of the layer 526 is less than the Z height of the layer 518 in the part 510, the platen 500 is indexed to allow for the printing of the layer 526, which completes the printing of the part 520. As the part 520 is printed, the platen 500 is indexed to allow for the printing of the remaining layer 518 of the part 510, which completes the print job.

While the indexing in the Z direction is described in the Example as being done by the platen, it is understood that the change in Z height can be caused by moving the platen, moving the print head in the Z direction or a combination thereof.

Example 2

Figure 11:
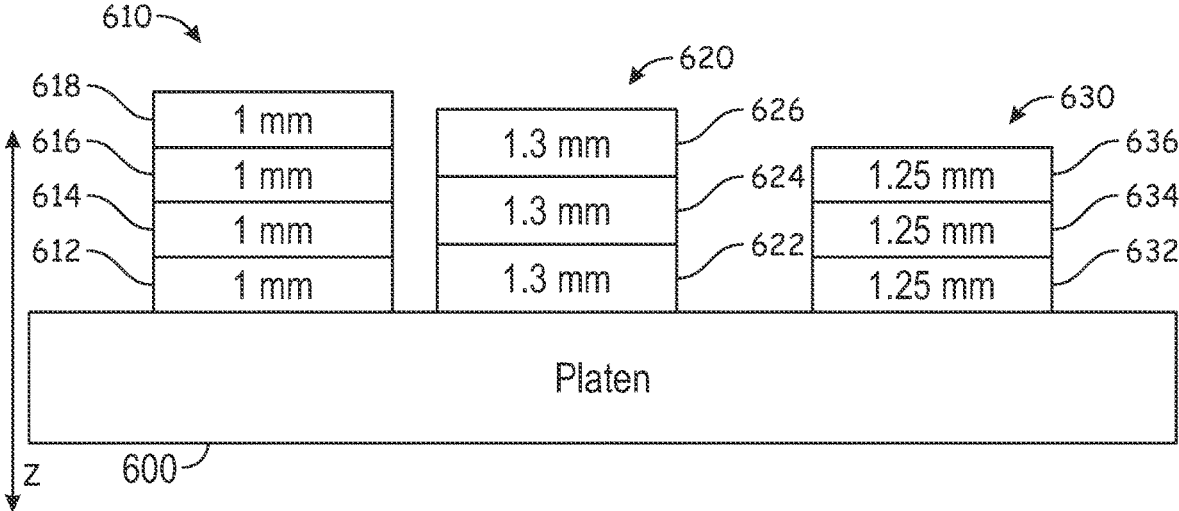
FIG. 11 is a schematic view of three parts of different slice heights being printed on the same platen.

A three-part build job where the three parts have differing layer heights is disclosed. Referring to FIG. 11, the layer sequencing for parts 610, 620 and 630 is illustrated with a platen 600 moving in the Z direction. For purposes of example, the part 610 has been assigned a slice height value of 1 mm, the part 620 has been assigned a height value of 1.3 mm and the part 630 has been assigned the. Using the above methodology, the Z heights of the first layers 612, 622 and 632 of the parts 610, 620 and 6300 are compared. The layer 612 is selected to be printed because the Z height of the layer 612 is less than that of the layers 622 and 632. The platen 600 is incremented downwardly to allow the printing of the layer 612.

Once the layer 612 is printed, the Z height of layer 614 in the part 610 is compared to the Z height of the layers 622 and 632 in the parts 620 and 630. As the layer 632 has the lowest Z height of the three layers, the platen 600 is incremented in the Z direction to allow for the printing of the layer 632.

Once the layer 632 is printed, the Z heights of the layers 614, 622 and 634 are compared. As the layer 614 has the lowest Z height of the three layers, the platen 600 is incremented in the Z direction to allow for the printing of the layer 622.

Once the layer 622 is printed, the Z heights of the layers 614, 624 and 634 are compared. As the layer 614 has the lowest Z height of the three layers, the platen 600 is incremented in the Z direction to allow for the printing of the layer 614.

Once the layer 614 is printed, the Z heights of the layers 616, 624 and 634 are compared. As the layer 634 has the lowest Z height of the three layers, the platen 600 is incremented in the Z direction to allow for the printing of the layer 634.

Once the layer 634 is printed, the Z heights of the layers 616, 624 and 636 are compared. As the layer 624 has the lowest Z height of the three layers, the platen 600 is incremented in the Z direction to allow for the printing of the layer 624.

Once the layer 624 is printed, the Z heights of the layers 616, 626 and 636 are compared. As the layer 616 has the lowest Z height of the three layers, the platen 600 is incremented in the Z direction to allow for the printing of the layer 616.

Once the layer 616 is printed, the Z heights of the layers 618, 626 and 636 are compared. As the layer 636 has the lowest Z height of the three layers, the platen 600 is incremented in the Z direction to allow for the printing of the layer 636. Once the layer 636 is printed, the part 630 is completely printed.

Once the layer 636 is printed, the Z heights of the layers 618 and 626 are compared. As the layer 626 has the lowest Z height of relative to the layer 618, the platen 600 is incremented in the Z direction to allow for the printing of the layer 626. Once the layer 626 is printed, the part 626 is completely printed.

The remaining layer 618 of the part 610 is then printed to complete the print job.

While the indexing in the Z direction is described in the Example as being done by the platen, it is understood that the change in Z height can be caused by moving the platen, moving the print head in the Z direction or a combination thereof.

Although the present disclosure may have been described with reference to preferred embodiments, workers skilled in the art will recognize that changes may be made in form and detail without departing from the spirit and scope of the disclosure.

The invention claimed is:

1. A method of printing a plurality of parts in a material extrusion 3D printer, the method comprising:
   providing a plurality of sliced 3D digital representations of a plurality of parts with varying slice heights in the Z direction;
   positioning the digital representation of parts on a build platform of the 3D printer;
   determining a printing sequence of the layers of the utilizing the steps of:
   comparing the Z height of the next layer of each of the plurality of sliced 3D presentations of the plurality of parts;
   selecting a part of the plurality of parts that has the lowest Z height value;
   sequencing layers of the plurality of parts based upon the lowest Z height value; and repeating the comparing, selecting and sequencing steps until each of the sliced layers of each 3D digital representations of the plurality of parts has been sequenced;
   extruding a layer of the plurality of parts with one or more print heads based upon the determined printing sequence to print the plurality of parts;
   indexing a Z height between the sequenced layers; and
   repeating the extruding and indexing steps until each of the plurality of parts is printed.

2. The method of claim 1, wherein a plurality of sequenced layers of the plurality of parts comprises part material and support material.

3. The method of claim 2, wherein a next layer of the plurality of sequenced layers of the plurality of parts begins printing with the part material or the support material last used to print a prior layer of the plurality of sequenced layers.

4. The method of claim 1 and further comprising:
   generating toolpaths for each layer of each of the plurality of parts; and
   grouping the generated tool paths for each layer of the plurality of parts prior to extruding the layers.

5. The method of claim 4, wherein the grouping of the toolpaths is based upon the plurality of sequenced layers of the plurality of parts.

6. The method of claim 1, wherein comparing the Z height comprises:
   extracting the plurality of layers of the plurality of sliced 3D digital representations of the plurality of parts; and
   comparing the Z heights of the extracted plurality of layers.

7. The method of claim 1 and further comprising:
   indexing a platen of the 3D printer in the Z direction based upon the determined Z height in each layer of the printing sequence of the layers.

8. The method of claim 1 and further comprising:
   indexing a platen, moving a print head or a combination thereof in the Z direction based upon the determined Z height in each layer of the sequence of the layers of the plurality of parts.

9. The method of claim 1 and further comprising:
   adjusting a thickness of the extruded layers by adjusting a flow rate at which the material is extruded while maintaining a substantially constant speed of the print head.

10. The method of claim 1 and further comprising:
   adjusting a thickness of the extruded layers by adjusting a speed at which the print head is moving.

11. The method of claim 1 and further comprising:
   adjusting a thickness of the extruded layers by adjusting a speed at which the print head is moving and adjusting a flow rate at which the material is extruded.

12. The method of claim 1 and further comprising:
   adjusting a thickness of the extruded layers by swapping print heads having different flow rate capabilities.

13. An extrusion-based additive manufacturing system comprising:
   a plurality of print heads configured to extrude thermoplastic based material;
   a platen configured to move in a Z direction;
   a software program configured to:
   receive a plurality of sliced 3D digital representations of a plurality of parts with varying slice heights in the Z direction;
   position the digital representation of parts on a build platform of the 3D printer; and 15
16 determine a printing sequence of the layers of the plurality of parts based upon a lowest Z height between the plurality of sliced 3D digital representations, utilizing the steps of:

comparing the Z height of a next layer of each of the plurality of sliced 3D digital representations of the plurality of parts;

selecting a layer of a part of the plurality of parts that has the lowest Z height value; and repeating the comparing and selecting steps until each of the sliced layers of each 3D digital representations of a plurality of parts has been sequenced; and a controller configured for controlling the at least one print head and the platen based upon the determined printing sequence to extrude a flow of part material and support material in layers based to print the plurality of parts in a single print job.

14. The extrusion-based additive manufacturing system of claim 13, wherein the software is further configured to:

generate toolpaths for each layer in the printing sequence of the layers of the plurality of parts; and group the generated tool paths for each layer in the printing sequence of the layers of the plurality of parts.

15. The extrusion-based additive manufacturing system of claim 13, wherein during comparing the Z height, the software is configured to:

extract the plurality of layers of the plurality of sliced 3D digital representations of the plurality of parts; and compare the Z heights of the extracted plurality of layers.

16. The extrusion-based additive manufacturing system of claim 13, wherein the controller is configured to move the platen in the Z direction based upon the determine Z heights in the determined print sequence of the layers.

17. The extrusion-based additive manufacturing system of claim 13, wherein the controller is configured to move the platen and the at least one print head in the Z direction based upon the determine Z heights in the determined print sequence of the layers.

18. The extrusion-based additive manufacturing system of claim 13, wherein the controller is configured to adjust a flow rate from the at least one print head while maintaining the print head at a substantially constant speed to adjust for varying height thickness in the determined print sequence of layers.

19. The extrusion-based additive manufacturing system of claim 13, wherein the controller is configured to adjust a speed of travel of the at least one print head to adjust for varying height thickness in the determined print sequence of layers.

20. The extrusion-based additive manufacturing system of claim 13, wherein the at least one print head comprises a plurality of print heads and wherein the controller is configured to swap print heads with different extrusion capabilities to adjust for varying height thickness in the determined print sequence of layers.

21. The extrusion-based additive manufacturing system of claim 13, wherein the controller is configured to cause the print head to begin printing a next layer of the plurality of sequenced layers of the plurality of parts with the part material or the support material last used to print a prior layer of the plurality of sequenced layers.

22. The extrusion-based additive manufacturing system of claim 13, wherein the software is further configured to:

provide a determined Z height offset value in which a plurality of layers of disjoined parts can be printed without adjusting a Z height within the 3D printer;

determine whether a Z height difference between adjacent layers within the determined print sequence is below the determined Z height offset value; and wherein the controller is configured to print adjacent layers within the determined print sequence that are below the determined Z height offset value without adjusting a Z height of a platen or a print head of the 3D printer.

23. A method of printing a plurality of parts in a material extrusion 3D printer, the method comprising:

providing a plurality of sliced 3D digital representations of a plurality of parts with varying slice heights in the Z direction;

positioning the digital representation of parts on a build platform of the 3D printer;

determining a printing sequence of the layers of the utilizing the steps of:

provide a determined Z height offset value in which a plurality of layers of disjoined parts can be printed without adjusting a Z height within the 3D printer;

comparing the Z height of the next layer of each of the plurality of sliced 3D presentations of the plurality of parts;

selecting a part of the plurality of parts that has the lowest Z height value;

sequencing layers of the plurality of parts based upon the lowest Z height value;

determine whether a Z height difference between adjacent layers within the determined print sequence is below the determined Z height offset value; and repeating the comparing, selecting and sequencing steps until each of the sliced layers of each 3D digital representations of the plurality of parts has been sequenced;

extruding a layer of the plurality of parts with one or more print heads based upon the determined printing sequence to print the plurality of parts;

indexing a Z height between the sequenced layers; and repeating the extruding and indexing steps until each of the plurality of parts is printed.

* * * * *